United States Patent
Jung

(10) Patent No.: US 11,401,655 B2
(45) Date of Patent: Aug. 2, 2022

(54) NATURAL DYEING METHOD USING FERMENTED PERSIMMON JUICE

(71) Applicant: ISAE FnC, Ltd., Seoul (KR)

(72) Inventor: Kyoung A Jung, Seoul (KR)

(73) Assignee: ISAE FnC, Ltd., Seoul (KR)

(*) Notice: Subject to any disclaimer, the term of this patent is extended or adjusted under 35 U.S.C. 154(b) by 81 days.

(21) Appl. No.: 17/132,721

(22) Filed: Dec. 23, 2020

(65) Prior Publication Data

US 2022/0178072 A1   Jun. 9, 2022

(30) Foreign Application Priority Data

Dec. 4, 2020 (KR) .................. 10-2020-0167937

(51) Int. Cl.

| | |
|---|---|
| *D06P 1/34* | (2006.01) |
| *C09B 61/00* | (2006.01) |
| *D06P 1/00* | (2006.01) |
| *D06P 5/00* | (2006.01) |
| *D06P 1/52* | (2006.01) |
| *D06P 3/14* | (2006.01) |
| *D06P 3/60* | (2006.01) |
| *D06P 3/04* | (2006.01) |

(52) U.S. Cl.
CPC ............... *D06P 1/34* (2013.01); *C09B 61/00* (2013.01); *D06P 1/0036* (2013.01); *D06P 1/0056* (2013.01); *D06P 1/5292* (2013.01); *D06P 5/002* (2013.01); *D06P 3/047* (2013.01); *D06P 3/145* (2013.01); *D06P 3/605* (2013.01)

(58) Field of Classification Search
CPC ........ D06P 1/34; D06P 1/0036; D06P 1/0056; D06P 1/5292; D06P 3/047; D06P 3/145; D06P 3/605; D06P 5/002; C09B 61/00
See application file for complete search history.

(56) References Cited

U.S. PATENT DOCUMENTS

| | | | | |
|---|---|---|---|---|
| 2011/0185518 A1* | 8/2011 | Park | ................ | D06P 1/673 8/646 |
| 2012/0088015 A1* | 4/2012 | Han | ................ | A23L 33/21 426/231 |

FOREIGN PATENT DOCUMENTS

| | | | | |
|---|---|---|---|---|
| CN | 101215507 | * | 7/2008 | ............. C12G 3/02 |
| CN | 110656511 A | | 1/2020 | |
| KR | 2009086856 | * | 8/2009 | ............. C09B 61/00 |
| KR | 10-0943629 B1 | | 2/2010 | |
| KR | 1020100056060 A | | 5/2010 | |
| KR | 10-2015-0105529 A | | 9/2015 | |
| KR | 101654083 | * | 9/2016 | ............. D06P 1/34 |
| KR | 10-1751427 B1 | | 6/2017 | |
| KR | 1751427 | * | 6/2017 | ............. D06P 1/34 |
| KR | 10-2018738 B1 | | 11/2019 | |
| KR | 102018737 B1 | | 11/2019 | |

OTHER PUBLICATIONS

Extended European Search Report of European Patent Application No. 20216960.3—7 pages (dated Jul. 5, 2021).
Office Action in Korean Application No. 10-2020-0167937 dated Apr. 19, 2022 in 5 pages.

* cited by examiner

*Primary Examiner* — Amina S Khan
(74) *Attorney, Agent, or Firm* — Knobbe Martens Olson & Bear LLP

(57) ABSTRACT

The present disclosure relates to a natural dyeing method using fermented persimmon juice, and more particularly to a natural dyeing method using fermented persimmon juice, which prevents the discoloration of a naturally dyed fabric, is harmless to the human body, and exhibits excellent color development, excellent antibacterial activity, excellent deodorization, and excellent dyeing fastness such as friction fastness and light fastness.

10 Claims, No Drawings

NATURAL DYEING METHOD USING FERMENTED PERSIMMON JUICE

CROSS-REFERENCE TO RELATED APPLICATION

This application claims priority to and the benefit of Korean Patent Application No. 10-2020-0167937, filed on Dec. 4, 2020, the disclosure of which is incorporated herein by reference in its entirety.

BACKGROUND

1. Field

The present disclosure relates to a natural dyeing method using fermented persimmon juice.

2. Discussion of Related Art

Generally, natural dyeing refers to the process of coloring fabrics using vegetable, animal, or mineral dyes. Such natural dyeing is characterized by not having higher color saturation than chemical dyes, and being highly eco-friendly and highly human-friendly.

Compared with synthetic dyeing, such natural dyeing is advantageous in terms of natural color, excellent aesthetic performance, and having functionalities such as antibacterial, deodorizing, and anti-allergic properties due to natural dyeing using processed natural materials as dyes. In addition, natural dyes are advantageous in that wastewater and odor, which accompany the use of synthetic dyes, do not occur, and they are eco-friendly.

Korean Patent Publication No. 10-2015-0105529 (publication date: Sep. 17, 2015) and Korean Patent Registration No. 10-1751427 (publication date: Apr. 14, 2017) disclose related technologies. The disclosure of this section is to provide background information relating to the present disclosure. Applicant does not admit that any information contained in this section constitutes prior art.

SUMMARY

The present disclosure provides fermented persimmon juice that not only undergoes no color change, but also exhibits excellent antibacterial activity and deodorization, and not only exhibits excellent management and practicality without a change in the shape of a material, but also exhibits excellent natural dyeing properties and excellent dyeing fastness such as friction fastness and light fastness.

The present disclosure provides a natural dyeing method using fermented persimmon juice, which prevents the discoloration of a naturally dyed fabric, is harmless to the human body, and exhibits excellent color development, excellent antibacterial activity, excellent deodorization, and excellent dyeing fastness such as friction fastness and light fastness.

According to an aspect of the present disclosure, a natural dyeing method using fermented persimmon juice includes: a first process of preparing fermented persimmon juice; a second process of adding a fabric and the fermented persimmon juice to a sealed container and hermetically storing the same at a temperature between about 20° C. and about 30° C. for about 6 hours to about 10 hours; a third process of performing a dying process by immersing the fabric taken out of the sealed container in the fermented persimmon juice and drying the immersed fabric; a fourth process of uniformly spraying water onto both surfaces of the fabric subjected to the dyeing process to perform a color development process by oxidative polymerization; a fifth process of performing a post-treatment process by immersing the fabric subjected to the color development process by oxidative polymerization in water for about 18 hours to about 30 hours and drying the immersed fabric; and a sixth process of coating both surfaces of the fabric subjected to the post-treatment process with a silicon coating solution to produce a naturally dyed fabric.

In an embodiment of the present disclosure, the fermented persimmon juice prepared in the first process may be prepared through process 1-1 of aging crushed fresh persimmon for about 18 hours to about 30 hours, process 1-2 of squeezing the aged crushed fresh persimmon to produce persimmon juice, and process 1-3 of fermenting the produced persimmon juice for about 800 days to about 1,200 days to produce fermented persimmon juice.

In an embodiment of the present disclosure, the aging of process 1-1 may be performed at a temperature ranging from about 24° C. to about 32° C., and the fermentation of process 1-3 may be performed at a temperature ranging from about 14° C. to about 20° C.

In an embodiment of the present disclosure, the immersion of the third process may be performed for about 3 minutes to about 11 minutes.

In an embodiment of the present disclosure, the color development process by oxidative polymerization of the fourth process may be performed two to six times.

In an embodiment of the present disclosure, the spraying of the fourth process may include spraying about 300 ml to about 600 ml of water per 1 m² of the fabric.

In an embodiment of the present disclosure, the water in the fifth process may have a temperature ranging from about 90° C. to about 110° C.

In an embodiment of the present disclosure, the silicon coating solution may include a first silicon base solution and a second silicon base solution in a weight ratio of about 1:about 8-12.

In an embodiment of the present disclosure, the first silicon base solution may include about 65 wt % to about 75 wt % of a compound represented by Formula 1 below and about 25 wt % to about 35 wt % of a compound represented by Formula 2 below, with respect to the total weight %.

In an embodiment of the present disclosure, the second silicon base solution may include about 75 wt % to about 85 wt % of a compound represented by Formula 1 below, about 5 wt % to about 15 wt % of silicon dioxide, and about 5 wt % to about 15 wt % of a compound represented by Formula 3 below, with respect to the total weight %.

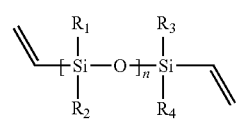

[Formula 1]

wherein, in Formula 1, $R_1$, $R_2$, $R_3$, and $R_4$ are each independently a C1-C5 alkyl group, and n is a rational number satisfying 1 to 500,

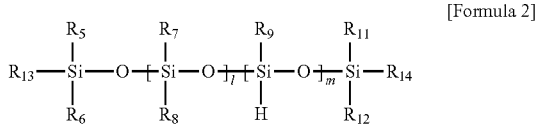

[Formula 2]

wherein, in Formula 2, $R_5$, $R_6$, $R_7$, $R_8$, $R_9$, $R_{11}$, $R_{12}$, $R_{13}$, and $R_{14}$ are each independently a C1-C5 alkyl group, and l and m are each independently a rational number satisfying 1 to 300, and

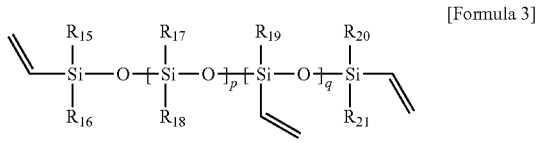

[Formula 3]

wherein, in Formula 3, $R_{15}$, $R_{16}$, $R_{17}$, $R_{18}$, $R_{19}$, $R_{20}$ and $R_{21}$ are each independently a C1-C5 alkyl group, and q and p are each a rational number satisfying 1 to 300.

In an embodiment of the present disclosure, the fabric may be cotton, linen, silk, or wool.

In an embodiment of the present disclosure, the following condition (1) may be satisfied.

$$1.0 \leq B/A \leq 1.25 \quad (1)$$

In condition (1), A denotes a basis weight (g/m²) of the fabric, and B denotes a basis weight (g/m²) of the naturally dyed fabric.

DETAILED DESCRIPTION OF EMBODIMENTS

Hereinafter, embodiments of the present disclosure will be described in detail in such a way that the present disclosure may be easily carried out by those of ordinary skill in the art to which the disclosure pertains. The present disclosure may be embodied in various different forms and is not limited to embodiments set forth herein. Generally, the use of natural dyes gradually decreases as synthetic dyes are developed, due to limited production of dyes, unsatisfactory fastness of dyed products, and ease of forming dyeing stains, and thus currently, natural dyes are not used much except for special purposes. In natural dyes, the content of a pigment component varies depending on various environmental changes, such as production area, growing environment, nutritional status, and collection time, and the color of a dyed product varies depending on a pigment extraction method, a dyeing method, and the like, and thus natural dyes are not very suitable for mass production required by modern industry, which is one of reasons for poor industrialization thereof. In particular, low fastness of dyed products during natural dyeing is considered as one of obstacles to the modernization of natural dye dyeing techniques.

Meanwhile, persimmon is a tuber vegetable belonging to the hemp family, and persimmon juice has typically been used as a dye to dye textiles. An example of a dyeing method uses a persimmon juice dye and a natural dye. However, in the above-described method, as the method not only uses only pure persimmon juice, but also requires a process of pre-treating a fabric with a dye extracted from natural dye stuffs and soybean juice to prevent the occurrence of stains, dyeing processes and costs are increased, resulting in reduced economic efficiency and productivity.

In the present disclosure, a method of naturally dyeing a fabric using fermented persimmon juice obtained by fermenting persimmon juice under specific conditions, whereby not only excellent color development but also excellent antibacterial activity are exhibited, and decolorization of natural dyeing due to daylight, washing, water, sweat, and the like can be prevented, was developed, thus completing the present disclosure.

A natural dyeing method using fermented persimmon juice according to the present disclosure includes first to sixth processes.

First, the first process of the natural dyeing method using fermented persimmon juice according to the present disclosure may be to prepare fermented persimmon juice.

The fermented persimmon juice prepared in the first process is prepared by fermenting persimmon juice obtained by squeezing persimmons, and particularly, may be prepared by process 1-1 to process 1-3.

First, process 1-1 of the preparation of the fermented persimmon juice may be to age crushed fresh persimmon for about 18 hours to about 30 hours, in one embodiment, about 21 hours to about 27 hours. In this case, the crushed fresh persimmon may be obtained by washing naturally collected persimmons and crushing the same.

When the aging time of process 1-1 is less than 18 hours, in performing process 1-3, fermentation does not sufficiently occur, and thus dye adsorption problems may occur. When the aging time of process 1-1 exceeds 30 hours, contamination and deterioration may occur.

In addition, the aging of process 1-1 may be performed at a temperature ranging from about 24° C. to about 32° C., in one embodiment, about 26° C. to about 30° C. When the aging temperature is less than 24° C., fermentation may not occur in process 1-3. When the aging temperature exceeds 32° C., bad odor and contamination may occur.

Next, process 1-2 of the preparation of the fermented persimmon juice may be to produce persimmon juice obtained by squeezing the crushed fresh persimmon aged in process 1-1. In this case, before process 1-2, air bubbles generated in the crushed fresh persimmon aged in process 1-1 may be removed, and then the crushed fresh persimmon may be squeezed, thereby preparing persimmon juice.

Lastly, process 1-3 of the preparation of the fermented persimmon juice may be to ferment the persimmon juice prepared in process 1-2 for about 800 days to about 1,200 days, in one embodiment, about 900 days to about 1,100 days to thereby produce fermented persimmon juice.

When the fermentation time of process 1-3 is less than 800 days, dyeing may not be uniform due to an insufficient function of a dyeing agent. When the fermentation time of process 1-3 exceeds 1,200 days, damage to fabric and bad odor may occur when performing dyeing.

In addition, the fermentation of process 1-3 may be performed at a temperature ranging from about 14° C. to about 20° C., in one embodiment, about 15° C. to about 19° C. When the fermentation temperature is less than 14° C., fermentation may not occur. When the fermentation temperature exceeds 20° C., uniform dye extraction may not occur due to excessive generation of air bubbles.

Next, the second process of the natural dyeing method using fermented persimmon juice according to the present disclosure may be to add a fabric and the fermented persimmon juice prepared in the first process to a sealed container and hermetically store the same at a temperature ranging from about 20° C. to about 30° C., in one embodiment, about 22° C. to about 28° C. for about 6 hours to about 10 hours, in one embodiment, about 7 hours to about 9 hours.

The fabric prepared in the second process may be cotton, linen, silk, or wool, in one embodiment, cotton.

In addition, the basis weight of the fabric prepared in the second process is not particularly limited, but may range from, in one embodiment, about 44 g/m² to about 64 g/m², in another embodiment, about 52 g/m² to about 56 g/m².

When the hermetic storage temperature of the second process is less than 20° C., the fermented persimmon juice may not be sufficiently fixed to the fabric. When the hermetic storage temperature of the second process exceeds 30° C., stains and damage to the fabric may occur. In addition, when the hermetic storage time of the second process is less than 6 hours, the fermented persimmon juice may not be sufficiently fixed to the fabric. When the hermetic storage time of the second process exceeds 10 hours, damage to the fabric and a unique odor remaining on the fabric may occur.

Next, the third process of the natural dyeing method using fermented persimmon juice according to the present disclosure may be to perform a dyeing process by immersing the fabric taken out of the sealed container in the fermented persimmon juice prepared in the first process and drying the immersed fabric.

In this case, the immersion of the third process may be performed for about 3 minutes to about 11 minutes, in one embodiment, for about 5 minutes to about 9 minutes. When the immersion time is less than 3 minutes, the fermented persimmon juice may not be sufficiently fixed to the fabric so that stains can occur. When the immersion time exceeds 11 minutes, not only the fabric may be damaged, but also the color may be blurred.

In addition, the drying of the third process may be performed until the fabric is completely dried in a natural state after the immersed fabric is taken out of the fermented persimmon juice, and may be performed for approximately 1-5 hours.

Next, the fourth process of the natural dyeing method using fermented persimmon juice according to the present disclosure may be to perform a color development process by oxidative polymerization by uniformly spraying water onto both surfaces of the fabric subjected to the dyeing process. The color development process by oxidative polymerization is a process of developing a color on a fabric by moisture, oxygen, or the like in an environment where the fabric can come into contact with air, and the spraying of the fourth process may be performed by spraying water at an amount of about 300 ml to about 600 ml, in one embodiment, about 400 ml to about 500 ml, per 1 m² of the fabric. When less than 300 ml of water per 1 m² of the fabric is sprayed, the fermented persimmon juice may not be uniformly fixed to the fabric. When greater than 600 ml of water per 1 m² of the fabric is sprayed, color sharpness may deteriorate.

Meanwhile, the color development process by oxidative polymerization of the fourth process may be performed twice or more, in one embodiment, two to six times, and in another embodiment, three times to five times. When the color development process by oxidative polymerization of the fourth process is performed less than twice, color development problems may occur. When the color development process by oxidative polymerization of the fourth process is performed more than six times, stains and dull color may occur.

Next, the fifth process of the natural dyeing method using fermented persimmon juice according to the present disclosure may be a post-treatment process of immersing the fabric subjected to the color development process by oxidative polymerization in water for about 18 hours to about 30 hours, in one embodiment, about 20 hours to about 28 hours, and drying the immersed fabric. When the post-treatment process is not performed, dyeing fastness may be reduced.

In addition, the drying of the fifth process may be performed until the fabric is completely dried in a natural state after the immersed fabric is taken out of the water, and may be performed for approximately 1 to 5 hours.

In addition, when the immersion time of the fifth process is less than 18 hours, not only color persistence may be deteriorated, but also dyeing fastness may be reduced. When the immersion time of the fifth process exceeds 30 hours, the fabric may be damaged and a dye may be unstably fixed to the fabric.

Meanwhile, the water of the fifth process may be boiling water and may have a temperature ranging from, in one embodiment, about 90° C. to about 110° C., in another embodiment, about 95° C. to about 105° C., and, in still another embodiment, about 100° C. When the temperature of the water of the fifth process is less than 90° C., fastness and a deodorization rate may be reduced.

Lastly, the sixth process of the natural dyeing method using fermented persimmon juice according to the present disclosure may be to coat both surfaces of the fabric subjected to the post-treatment process with a silicon coating solution to thereby produce a naturally dyed fabric.

In this case, the basis weight of the naturally dyed fabric produced in the sixth process is not particularly limited, but may range from, in one embodiment, about 46 g/m² to about 66 g/m², in another embodiment, about 54 g/m² to about 58 g/m².

In addition, in embodiments, the following condition (1) may be satisfied.

(1) $1.0 \leq B/A \leq 1.25$, in one embodiment, $1.0 \leq B/A \leq 1.14$, in another embodiment, $1.02 \leq B/A \leq 1.08$ In condition (1), A denotes the basis weight (g/m²) of the fabric, and B denotes the basis weight (g/m²) of the naturally dyed fabric.

The silicon coating solution used in the sixth process may include a first silicon base solution and a second silicon base solution in a weight ratio of about 1:about 8-12, in one embodiment, about 1:about 9-11.

The first silicon base solution may include a compound represented by Formula 1 below in an amount of about 65 wt % to about 75 wt %, in one embodiment, about 68 wt % to about 72 wt %, with respect to the total weight %.

[Formula 1]

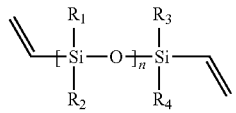

wherein, in Formula 1, $R_1$, $R_2$, $R_3$, and $R_4$ are each independently a C1-C5 alkyl group, in one embodiment, each independently a C1-C3 alkyl group, and n is a rational number satisfying 1 to 500, in one embodiment, a rational number satisfying 1 to 300.

More particularly, the compound represented by Formula 1 above may be a material with chemical abstracts service registry number (CAS No.) 68083-19-2.

In addition, the first silicon base solution may include a compound represented by Formula 2 below in an amount of about 25 wt % to about 35 wt %, in one embodiment, about 28 wt % to about 32 wt %, with respect to the total weight %.

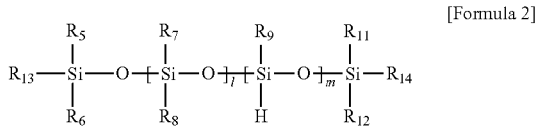

[Formula 2]

wherein, in Formula 2, $R_5$, $R_6$, $R_7$, $R_8$, $R_9$, $R_{11}$, $R_{12}$, $R_{13}$, and $R_{14}$ are each independently a C1-C5 alkyl group, in one embodiment, each independently a C1-C3 alkyl group, and 1 and m are each independently a rational number satisfying 1 to 300, in one embodiment, each independently a rational number satisfying 1 to 150.

More particularly, the compound represented by Formula 2 may be a material with chemical abstracts service registry number (CAS No.) 68037-59-2.

In addition, the second silicon base solution may include the compound represented by Formula 1 in an amount of about 75 wt % to about 85 wt %, in one embodiment, about 78 wt % to about 82 wt %, with respect to the total weight %.

In addition, the second silicon base solution may include silicon dioxide in an amount of about 5 wt % to about 15 wt %, in one embodiment, about 8 wt % to about 12 wt %, with respect to the total weight %.

In addition, the second silicon base solution may include a compound represented by Formula 3 below in an amount of about 5 wt % to about 15 wt %, in one embodiment, about 8 wt % to about 12 wt %, with respect to the total weight %.

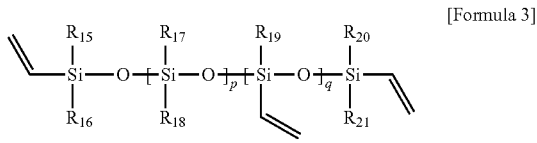

[Formula 3]

wherein, in Formula 3, $R_{15}$, $R_{16}$, $R_{17}$, $R_{18}$, $R_{19}$, $R_{20}$, and $R_{21}$ are each independently a C1-C5 alkyl group, in one embodiment, a C1-C3 alkyl group, and q and p are each independently a rational number satisfying 1 to 300, in one embodiment, each independently a rational number satisfying 1 to 150.

More particularly, the compound represented by Formula 3 may be a material with chemical abstracts service registry number (CAS No.) 68083-18-1.

In addition, the sixth process may be to coat both surfaces of the fabric subjected to the post-treatment process with a silicon coating solution and cure the coated fabric at a temperature ranging from about 100° C. to about 150° C., in one embodiment, about 110° C. to about 140° C., for about 1 minute to about 5 minutes, in one embodiment, for about 2 minutes to about 4 minutes, thereby producing naturally dyed fabric.

While the embodiments of the present disclosure have been described, these embodiments are provided for illustrative purposes only and are not intended to limit the scope of the present disclosure, and it will become apparent to those of ordinary skill in the art to which embodiments of the present disclosure pertain that various modifications and applications, which are not set forth herein, can be made without departing from the essential characteristics of the present disclosure. For example, each of the elements specifically shown in the embodiments of the present disclosure can be modified. Also, differences related to these modifications and applications should be construed as being within the scope of the present disclosure defined by the appended claims.

Preparation Example 1: Preparation of Fermented Persimmon Juice

Fresh persimmons harvested between early August and mid-August in Cheongdo-gun, Gyeongsangbuk-do, the Republic of Korea were washed and crushed to prepare crushed fresh persimmon. The prepared crushed fresh persimmon was aged at a temperature of 28° C. for 24 hours. Air bubbles generated in the crushed fresh persimmon by aging were removed, and the crushed fresh persimmon from which air bubbles had been removed was squeezed to thereby produce persimmon juice.

The prepared persimmon juice was fermented in a storage room maintained at a temperature of 17° C. for 1,000 days to thereby produce fermented persimmon juice.

Preparation Example 2: Preparation of Fermented Persimmon Juice

Fermented persimmon juice was prepared in the same manner as in Preparation Example 1, except that the aging was performed at a temperature of 20° C. to finally produce fermented persimmon juice.

Preparation Example 3: Preparation of Fermented Persimmon Juice

Fermented persimmon juice was prepared in the same manner as in Preparation Example 1, except that the aging was performed at a temperature of 40° C. to finally produce fermented persimmon juice.

Preparation Example 4: Preparation of Fermented Persimmon Juice

Fermented persimmon juice was prepared in the same manner as in Preparation Example 1, except that the aging was performed at a temperature of 7° C. to finally produce fermented persimmon juice.

Preparation Example 5: Preparation of Fermented Persimmon Juice

Fermented persimmon juice was prepared in the same manner as in Preparation Example 1, except that the aging was performed at a temperature of 30° C. to finally produce fermented persimmon juice.

Preparation Example 6: Preparation of Fermented Persimmon Juice

Fermented persimmon juice was prepared in the same manner as in Preparation Example 1, except that the fermentation was performed for 600 days to finally produce fermented persimmon juice.

Preparation Example 7: Preparation of Fermented Persimmon Juice

Fermented persimmon juice was prepared in the same manner as in Preparation Example 1, except that the fermentation was performed for 1,400 days to finally produce fermented persimmon juice.

Comparative Preparation Example 1: Preparation of Persimmon Juice

Fresh persimmons harvested between early August and mid-August in Cheongdo-gun, Gyeongsangbuk-do, the Republic of Korea were washed and crushed to prepare crushed fresh persimmon. The prepared crushed fresh persimmon was aged at a temperature of 28° C. for 24 hours. Air bubbles generated in the crushed fresh persimmon by aging were removed, and the crushed fresh persimmon from which air bubbles had been removed was squeezed to thereby produce persimmon juice.

Preparation Example 8: Preparation of Silicon Coating Solution (1) A first silicon base solution including, with respect to the total weight %, 70 wt % of a compound represented by Formula 1-1 below and 30 wt % of a compound represented by Formula 2-1 below was prepared.

(2) A second silicon base solution including, with respect to the total weight %, 80 wt % of a compound represented by Formula 1-1 below, 10 wt % of silicon dioxide, and 10 wt % of a compound represented by Formula 3-1 below was prepared.

(3) The first silicon base solution and the second silicon base solution were mixed in a weight ratio of 1:10 to thereby prepare a silicon coating solution.

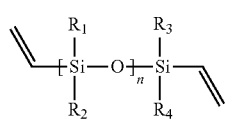

[Formula 1-1]

wherein, in Formula 1-1, $R_1$, $R_2$, $R_3$, and $R_4$ are methyl groups, and n is 1.

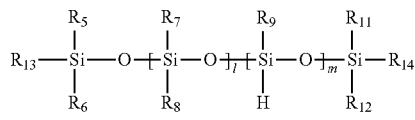

[Formula 2-1]

wherein, in Formula 2-1, $R_5$, $R_6$, $R_7$, $R_8$, $R_9$, $R_{11}$, $R_{12}$, $R_{13}$, and $R_{14}$ are methyl groups, and l and m are 1.

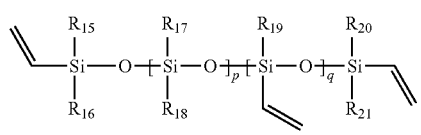

[Formula 3-1]

wherein, in Formula 3-1, $R_{15}$, $R_{16}$, $R_{17}$, $R_{18}$, $R_{19}$, $R_{20}$, and $R_{21}$ are methyl groups, and q and p are 1.

Example 1: Production of Naturally Dyed Fabric Using Fermented Persimmon Juice (1) Cotton having a basis weight of 54 g/m² was prepared as a fabric.

(2) The prepared fabric and the fermented persimmon juice prepared according to Preparation Example 1 were added to a sealed container and hermetically stored at a temperature of 25° C. for 8 hours.

(3) A dyeing process was performed by taking the fabric out of the sealed container, and then immersing the fabric in the fermented persimmon juice prepared according to Preparation Example 1 for 7 minutes, taking out the immersed fabric, and completely drying the fabric in a natural state.

(4) A color development process by oxidative polymerization was performed by uniformly spraying water onto both surfaces of the fabric subjected to the dyeing process, and drying the fabric in an environment enabling the fabric to come into contact with air, and the color development process by oxidative polymerization was performed four times. At this time, 450 ml of water per 1 m² of the fabric was sprayed.

(5) A post-treatment process was performed by immersing the fabric subjected to the color development process by oxidative polymerization in boiling water at 100° C. for 24 hours, taking out the immersed fabric, and then washing the fabric to remove impurities attached thereto and completely drying the fabric.

(6) Both surfaces of the fabric subjected to the post-treatment process were coated with the silicon coating solution prepared according to Preparation Example 8, followed by curing at a temperature of 120° C. for 2.5 minutes, thereby producing a naturally dyed fabric having a basis weight of 56 g/m².

Example 2: Production of Naturally Dyed Fabric Using Fermented Persimmon Juice A naturally dyed fabric was produced in the same manner as in Example 1, except that the fermented persimmon juice prepared according to Preparation Example 2 was used instead of the fermented persimmon juice prepared according to Preparation Example 1, to finally produce a naturally dyed fabric.

Example 3: Production of Naturally Dyed Fabric Using Fermented Persimmon Juice A naturally dyed fabric was produced in the same manner as in Example 1, except that the fermented persimmon juice prepared according to Preparation Example 3 was used instead of the fermented persimmon juice prepared according to Preparation Example 1, to finally produce a naturally dyed fabric.

Example 4: Production of Naturally Dyed Fabric Using Fermented Persimmon Juice A naturally dyed fabric was produced in the same manner as in Example 1, except that the fermented persimmon juice prepared according to Preparation Example 4 was used instead of the fermented persimmon juice prepared according to Preparation Example 1, to finally produce a naturally dyed fabric.

Example 5: Production of Naturally Dyed Fabric Using Fermented Persimmon Juice A naturally dyed fabric was produced in the same manner as in Example 1, except that the fermented persimmon juice prepared according to Preparation Example 5 was used instead of the fermented persimmon juice prepared according to Preparation Example 1, to finally produce a naturally dyed fabric.

Example 6: Production of Naturally Dyed Fabric Using Fermented Persimmon Juice A naturally dyed fabric was produced in the same manner as in Example 1, except that the fermented persimmon juice prepared according to Preparation Example 6 was used instead of the fermented persimmon juice prepared according to Preparation Example 1, to finally produce a naturally dyed fabric.

Example 7: Production of Naturally Dyed Fabric Using Fermented Persimmon Juice A naturally dyed fabric was produced in the same manner as in Example 1, except that the fermented persimmon juice prepared according to Preparation Example 7 was used instead of the fermented persimmon juice prepared according to Preparation Example 1, to finally produce a naturally dyed fabric.

Example 8: Production of Naturally Dyed Fabric Using Fermented Persimmon Juice A naturally dyed fabric was produced in the same manner as in Example 1, except that, in performing the dyeing process, the immersion was performed for only 2 minutes instead of 7 minutes, to finally produce a naturally dyed fabric.

Example 9: Production of Naturally Dyed Fabric Using Fermented Persimmon Juice A naturally dyed fabric was produced in the same manner as in Example 1, except that, in performing the dyeing process, the immersion was performed for 15 minutes instead of 7 minutes, to finally produce a naturally dyed fabric.

Example 10: Production of Naturally Dyed Fabric Using Fermented Persimmon Juice A naturally dyed fabric was produced in the same manner as in Example 1, except that, in performing the color development process by oxidative polymerization, 150 ml of water per 1 m$^2$ of the fabric was sprayed instead of spraying 450 ml of water per 1 m$^2$ of the fabric, to finally produce a naturally dyed fabric.

Example 11: Production of Naturally Dyed Fabric Using Fermented Persimmon Juice A naturally dyed fabric was produced in the same manner as in Example 1, except that, in performing the color development process by oxidative polymerization, 750 ml of water per 1 m$^2$ of the fabric was sprayed instead of spraying 450 ml of water per 1 m$^2$ of the fabric, to finally produce a naturally dyed fabric.

Example 12: Production of Naturally Dyed Fabric Using Fermented Persimmon Juice A naturally dyed fabric was produced in the same manner as in Example 1, except that, in performing the post-treatment process, the fabric was immersed in water at 70° C. instead of immersing the fabric in boiling water at 100° C., to finally produce a naturally dyed fabric.

Comparative Example 1: Production of Naturally Dyed Fabric Using Persimmon Juice A naturally dyed fabric was produced in the same manner as in Example 1, except that the persimmon juice prepared according to Comparative Preparation Example 1 was used instead of the fermented persimmon juice prepared according to Preparation Example 1, to finally produce a naturally dyed fabric.

Comparative Example 2: Production of Naturally Dyed Fabric Using Persimmon Juice A naturally dyed fabric was produced in the same manner as in Example 1, except that, in hermetically storing the fabric and the fermented persimmon juice prepared according to Preparation Example 1 in a sealed container, the hermetic storage was performed at a temperature of 45° C. instead of a temperature of 25° C., to finally produce a naturally dyed fabric.

Comparative Example 3: Production of Naturally Dyed Fabric Using Persimmon Juice A naturally dyed fabric was produced in the same manner as in Example 1, except that, in hermetically storing the fabric and the fermented persimmon juice prepared according to Preparation Example 1 in a sealed container, the hermetic storage was performed at a temperature of 5° C. instead of a temperature of 25° C., to finally produce a naturally dyed fabric.

Comparative Example 4: Production of Naturally Dyed Fabric Using Fermented Persimmon Juice (1) Cotton having a basis weight of 54 g/m$^2$ was prepared as fabric.

(2) The prepared fabric and the fermented persimmon juice prepared according to Preparation Example 1 were added to a sealed container and hermetically stored at a temperature of 25° C. for 8 hours.

(3) A dyeing process was performed by taking the fabric out of the sealed container, and then immersing the fabric in the fermented persimmon juice prepared according to Preparation Example 1 for 7 minutes, taking out the immersed fabric, and completely drying the fabric in a natural state.

(4) A color development process by oxidative polymerization was performed by uniformly spraying water onto both surfaces of the fabric subjected to the dyeing process, and drying the fabric in an environment enabling the fabric to come into contact with air, and the color development process by oxidative polymerization was performed four times. At this time, 450 ml of water per 1 m$^2$ of the fabric was sprayed.

(5) Both surfaces of the fabric subjected to the color development process by oxidative polymerization were coated with the silicon coating solution prepared according to Preparation Example 8, followed by curing at a temperature of 120° C. for 2.5 minutes, thereby producing a naturally dyed fabric.

Experimental Example 1

The following physical properties of each of the naturally dyed fabrics produced according to Examples 1 to 12 and Comparative Examples 1 to 4 were measured, and the results thereof are shown in Tables 1 to 3 below.

1. Fastness (1) Friction fastness was measured in accordance with the ISO 105-X12 test standard.

(2) Light/perspiration fastness was measured in accordance with the KS K 0701:2014 (B method, Xenon arc method) test standard.

(3) Light fastness was measured in accordance with the KS K ISO 105 B02:2015 (Xenon arc method) test standard.

(4) Dry cleaning fastness was measured in accordance with the KS K ISO 105 D01:2010 test standard.

(5) Perspiration fastness was measured in accordance with the KS K ISO 105 E04:2013 test standard.

2. Dry Cleaning Dimensional Change Rate (Solvent: Perchloroethylene)

A dry cleaning dimensional change rate was measured according to the KS K ISO 3759:2014 and KS K ISO 3175-3:2014 test standards.

(+) sign: elongation, (−) sign: contraction

3. Deodorization Rate

A deodorization rate was measured in accordance with the gas detector tube method.

1. Test Conditions

① Sample amount: 10 cm×10 cm (1.6 g)
② Test gas: ammonia ($NH_3$)
③ Concentration of injected test gas: 500 μg/mL
④ Volume of test vessel: 1000 mL 2. Test Environment ① Temperature: 20° C.
② Humidity: 65%

3. Deodorization rate (%)=[(concentration of blank gas-concentration of sample gas)/concentration of blank gas]×100

4. Antibacterial Activity

Antibacterial activity was measured in accordance with the KS K 0693:2016 test standard.

1. Test Bacteria:

Test bacterium ①: *Staphylococcus aureus* ATCC 6538
Test bacterium ②: *Klebsiella pneumoniae* ATCC 4352

2. Concentration of Inoculated Bacterial Solution:

Test bacterium ①: $1.0 \times 10^5$ CFU/mL
Test bacterium ②: $0.9 \times 10^5$ CFU/mL 3. Control: Standard Cotton Cloth 4. Non-ionic surfactant: Tween 80, 0.05% of inoculated bacterial solution added 5. Dyeing Appearance Evaluation Dyeing appearance was evaluated by 50 panelists, and the average score evaluated by each panelist was 0 to 10 points, with 8 or more points-Excellent, 6 to 7 points-Good, 4 to 5 points-Normal, 2 to 3 points-Somewhat inadequate, and less than 2 points-Inadequate.

TABLE 1

| Classification | | Example 1 | Example 2 | Example 3 | Example 4 | Example 5 |
|---|---|---|---|---|---|---|
| Fastness | Friction fastness (grade) | 4-5 | 4 | 4 | 4 | 4 |
| | Perspiration/light fastness (grade) | 5 | 4 | 5 | 4-5 | 4-5 |
| | Light fastness (grade) | 5 | 4 | 5 | 4-5 | 4-5 |
| | Dry cleaning fastness (grade) | 5 | 4 | 4 | 4-5 | 4-5 |
| | Perspiration fastness (grade) | 4-5 | 4 | 4 | 4-5 | 4 |
| Dry cleaning dimensional change rate (%) | Warp thread direction (length) | +0.1 | +0.3 | +0.1 | +0.2 | +0.2 |
| | Weft thread direction (width) | −0.2 | −0.2 | −0.3 | −0.2 | −0.2 |
| Deodorization rate (%) | Test period of 30 minutes | >99 | 70 | 60 | >99 | 69 |
| | Test period of 60 minutes | >99 | 75 | 66 | >99 | 74 |
| | Test period of 90 minutes | >99 | 79 | 70 | >99 | 77 |
| | Test period of 120 minutes | >99 | 80 | 76 | >99 | 80 |
| Antibacterial activity (%) | Test bacterium ① | >99.9 | 90 | 79 | >99.9 | 90 |
| | Test bacterium ② | >99.9 | 91 | 81 | >99.9 | 89 |
| Dyeing appearance | | Excellent | inadequate | Normal | Somewhat inadequate | inadequate |

| Classification | | Example 6 | Example 7 | Example 8 | Example 9 | Example 10 |
|---|---|---|---|---|---|---|
| Fastness | Friction fastness (grade) | 4 | 2-3 | 4 | 2-3 | 4-5 |
| | Perspiration/light fastness (grade) | 4 | 3 | 4 | 3 | 5 |

-continued

| Classification | | Example 6 | Example 7 | Example 8 | Example 9 | Example 10 |
|---|---|---|---|---|---|---|
| | Light fastness (grade) | 4 | 3 | 4 | 3 | 5 |
| | Dry cleaning fastness (grade) | 4 | 3 | 3 | 3 | 5 |
| | Perspiration fastness (grade) | 4-5 | 3 | 3-4 | 2-3 | 4-5 |
| Dry cleaning dimensional change rate (%) | Warp thread direction (length) | +0.2 | +0.8 | +0.5 | +0.7 | +0.1 |
| | Weft thread direction (width) | −0.3 | −0.7 | −0.4 | −0.6 | −0.3 |
| Deodorization rate (%) | Test period of 30 minutes | >99 | 58 | 72 | 65 | >99 |
| | Test period of 60 minutes | >99 | 65 | 80 | 72 | >99 |
| | Test period of 90 minutes | >99 | 68 | 86 | 77 | 77 |
| | Test period of 120 minutes | >99 | 70 | 88 | 80 | >99 |
| Antibacterial activity (%) | Test bacterium ① | >99.9 | 80 | 91 | 87 | >99.9 |
| | Test bacterium ② | >99.9 | 81 | 92 | 86 | >99.9 |
| Dyeing appearance | | Somewhat inadequate | Somewhat inadequate | Somewhat inadequate | Normal | Normal |

TABLE 3

| Classification | | Example 11 | Example 12 | Comparative Example 1 | Comparative Example 2 | Comparative Example 3 | Comparative Example 4 |
|---|---|---|---|---|---|---|---|
| Fastness | Friction fastness (grade) | 4-5 | 3 | 4 | 4-5 | 4-5 | 2 |
| | Perspiration/light fastness (grade) | 5 | 3 | 4 | 4 | 4 | 3 |
| | Light fastness (grade) | 5 | 4 | 4 | 4 | 4 | 3 |
| | Dry cleaning fastness (grade) | 5 | 4 | 4 | 4 | 4 | 3 |
| | Perspiration fastness (grade) | 4-5 | 3 | 4 | 4 | 4-5 | 2-3 |
| Dry cleaning dimensional change rate (%) | Warp thread direction (length) | +0.1 | +0.2 | +0.2 | +0.2 | +0.1 | +0.4 |
| | Weft thread direction (width) | −0.2 | −0.3 | −0.2 | −0.3 | −0.3 | −0.6 |
| Deodorization rate (%) | Test period of 30 minutes | >99 | 70 | 64 | 72 | 75 | >99 |
| | Test period of 60 minutes | >99 | 76 | 68 | 77 | 80 | >99 |
| | Test period of 90 minutes | >99 | 80 | 72 | 81 | 83 | >99 |
| | Test period of 120 minutes | >99 | 83 | 78 | 83 | 85 | >99 |
| Antibacterial activity (%) | Test bacterium ① | >99.9 | >99.9 | 89 | 91 | 93 | >99.9 |
| | Test bacterium ② | >99.9 | >99.9 | 88 | 90 | 93 | >99.9 |
| Dyeing appearance | | Normal | Good | inadequate | Somewhat inadequate | Somewhat inadequate | Normal |

As can be seen in Tables 1 to 3, it was confirmed that the naturally dyed fabric produced according to Example 1 exhibited excellent fastness, a small dimensional change rate, excellent antibacterial activity, an excellent deodorization rate, and excellent dyeing appearance.

As is apparent from the foregoing description, a natural dyeing method using fermented persimmon juice according to the present disclosure not only exhibits excellent dyeing fastness such as friction fastness and light fastness, but also is eco-friendly and exhibits excellent dyeing appearance, antibacterial activity, and deodorization.

Simple modifications or changes may be easily made in the present disclosure by those of ordinary skill in the art, and all of these modifications or changes should be construed as being within the scope of the present disclosure.

What is claimed is:
1. A natural dyeing method using fermented persimmon juice, the method comprising:
a first process of preparing fermented persimmon juice;
a second process of adding a fabric and the fermented persimmon juice to a sealed container and hermetically storing the fabric and the juice at a temperature between about 20° C. and about 30° C. for about 6 hours to about 10 hours;

a third process of performing a dying process by immersing the fabric taken out of the sealed container in the fermented persimmon juice and drying the immersed fabric;

a fourth process of uniformly spraying water onto both surfaces of the fabric subjected to the dyeing process to perform a color development process by oxidative polymerization;

a fifth process of performing a post-treatment process by immersing the fabric subjected to the color development process by oxidative polymerization in water for about 18 hours to about 30 hours and drying the immersed fabric; and a sixth process of coating both surfaces of the fabric subjected to the post-treatment process with a silicon coating solution to produce a naturally dyed fabric.

2. The natural dyeing method of claim 1, wherein the fermented persimmon juice is prepared through:

process 1-1 of aging crushed fresh persimmon for about 18 hours to about 30 hours;

process 1-2 of squeezing the aged crushed fresh persimmon to produce persimmon juice; and process 1-3 of aging the produced persimmon juice for about 800 days to about 1,200 days to produce fermented persimmon juice.

3. The natural dyeing method of claim 2, wherein the aging is performed at a temperature ranging from about 24° C. to about 32° C., and the fermentation is performed at a temperature ranging from about 14° C. to about 20° C.

4. The natural dyeing method of claim 1, wherein the immersion of the third process is performed for about 3 minutes to about 11 minutes.

5. The natural dyeing method of claim 1, wherein the color development process by oxidative polymerization of the fourth process is performed two to six times.

6. The natural dyeing method of claim 1, wherein the spraying of the fourth process comprises spraying about 300 ml to about 600 ml of water per 1 m² of the fabric.

7. The natural dyeing method of claim 1, wherein the water of the fifth process has a temperature ranging from about 90° C. to about 110° C.

8. The natural dyeing method of claim 1, wherein the silicon coating solution comprises a first silicon base solution and a second silicon base solution in a weight ratio of about 1:about 8-12, wherein the first silicon base solution comprises about 65 wt % to about 75 wt % of a compound represented by Formula 1 below and about 25 wt % to about 35 wt % of a compound represented by Formula 2 below, with respect to a total weight %, and the second silicon base solution comprises about 75 wt % to about 85 wt % of a compound represented by Formula 1 below, about 5 wt % to about 15 wt % of silicon dioxide, and about 5 wt % to about 15 wt % of a compound represented by Formula 3 below, with respect to a total weight %.

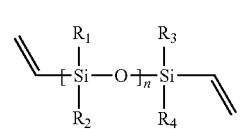

[Formula 1]

wherein, in Formula 1, $R_1$, $R_2$, $R_3$, and $R_4$ are each independently a C1-C5 alkyl group, and n is a rational number satisfying 1 to 500,

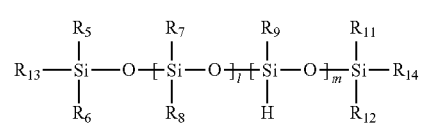

[Formula 2]

wherein, in Formula 2, $R_5$, $R_6$, $R_7$, $R_8$, $R_9$, $R_{11}$, $R_{12}$, $R_{13}$, and $R_{14}$ are each independently a C1-C5 alkyl group, and l and m are each independently a rational number satisfying 1 to 300, and

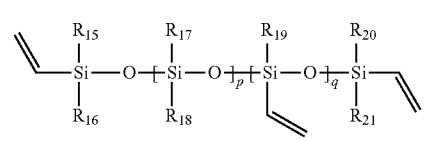

[Formula 3]

wherein, in Formula 3, $R_{15}$, $R_{16}$, $R_{17}$, $R_{18}$, $R_{19}$, $R_{20}$ and $R_{21}$ are each independently a C1-C5 alkyl group, and q and p are each a rational number satisfying 1 to 300.

9. The natural dyeing method of claim 1, wherein the fabric is cotton, linen, silk, or wool.

10. The natural dyeing method of claim 1, wherein condition (1) below is satisfied:

$$1.0 \leq B/A \leq 1.25 \tag{1}$$

wherein, in condition (1), A denotes a basis weight (g/m²) of the fabric, and B denotes a basis weight (g/m²) of the naturally dyed fabric.

* * * * *